US006607146B1

United States Patent
Alness et al.

(10) Patent No.: US 6,607,146 B1
(45) Date of Patent: Aug. 19, 2003

(54) APPARATUS FOR APPLICATION OF LIQUID USED IN AGRICULTURE, HORTICULTURE AND FORESTRY, USE OF SUCH AN APPARATUS, AND A METHOD OF ITS MANUFACTURING

(75) Inventors: Kenneth Alness, Knivsta (SE); Sven Andersson, Knivsta (SE); Per Bengtsson, Monsteras (SE); Sven Bergman, Uppsala (SE); Patrik Enfalt, Uppsala (SE); Anders Engqvist, Uppsala (SE); Niclas Engstrom, Enkoping (SE); Torvald Larsson, Kungsor (SE); Carl Westberg, Lanna (SE); Per Wretblad, Uppsala (SE)

(73) Assignee: Acanova AB, Uppsala (SE)

( * ) Notice: Subject to any disclaimer, the term of this patent is extended or adjusted under 35 U.S.C. 154(b) by 0 days.

(21) Appl. No.: 09/701,577

(22) PCT Filed: Jun. 7, 1999

(86) PCT No.: PCT/SE99/00977

§ 371 (c)(1),
(2), (4) Date: Dec. 11, 2000

(87) PCT Pub. No.: WO99/63810

PCT Pub. Date: Dec. 16, 1999

(30) Foreign Application Priority Data

Jun. 10, 1998 (SE) .............................................. 9802072

(51) Int. Cl.$^7$ ................................................. B05B 1/20
(52) U.S. Cl. ........................ 239/159; 239/166; 239/167; 239/169; 239/175; 239/176

(58) Field of Search .................................. 239/159, 161, 239/162, 163, 164, 166, 167, 169, 175, 176

(56) References Cited

U.S. PATENT DOCUMENTS

| 2,580,145 | A |   | 12/1951 | White |           |
|-----------|---|---|---------|-------|-----------|
| 3,515,349 | A | * | 6/1970  | Mecklin et al. | 239/169 |
| 4,659,017 | A | * | 4/1987  | Furness | 239/164 |
| 6,059,201 | A | * | 5/2000  | Weddle | 239/159 |

FOREIGN PATENT DOCUMENTS

| DE | 1482350 A1 | 5/1969 |
| DE | 2359400 B1 | 11/1974 |
| DK | 9700165 U3 | 6/1997 |
| EP | 0437801 A1 | 7/1991 |

* cited by examiner

Primary Examiner—Robin O. Evans
(74) Attorney, Agent, or Firm—Bacon & Thomas

(57) ABSTRACT

The invention relates to an apparatus to be mounted on an agricultural sprayer with the purpose of decreasing the drift and improving the deposition, penetration and uniformity of distribution when applying liquids, such as pesticides and liquid plant nutrients, the use of the apparatus and a method of manufacturing a movable part in one piece. The apparatus comprises a movable part (A) on which a sheet (B) and a sprayer (C) are mounted, which movable part (A) is mounted on a boom (D), and is characterized in that the movable part (A) is manufactured in one piece of an elastic material and is stiffened and weakened in sections and in mounting and use has the shape of a parallelogram.

14 Claims, 2 Drawing Sheets

Figure 1:
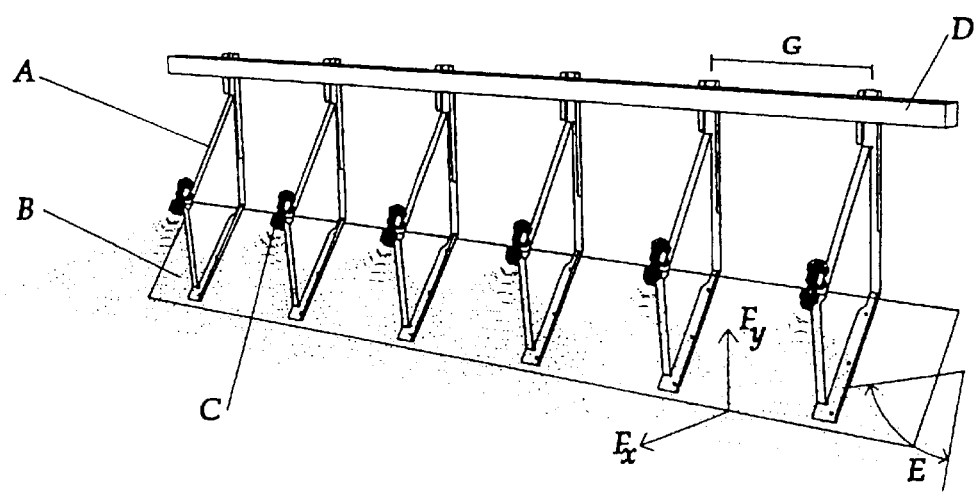

APPARATUS FOR APPLICATION OF LIQUID USED IN AGRICULTURE, HORTICULTURE AND FORESTRY, USE OF SUCH AN APPARATUS, AND A METHOD OF ITS MANUFACTURING

FIELD OF TECHNOLOGY

The present invention relates to an apparatus designed to be mounted on an agricultural sprayer with the purpose of decreasing the drift and improving the deposition, penetration and uniformity of distribution when applying liquids such as pesticides and liquid plant nutrients used in agriculture, horticulture and forestry.

BACKGROUND OF THE INVENTION

Application and handling of pesticides is a delicate task which may cause substantial costs, both economical and environmental. Consequently, it is of outermost importance for a long-term efficient and persistent production, e.g. food supply, that the distribution of pesticides is executed in an efficient and safe way. For the application method to meet these needs it is required to:

Reduce environmental impact: Decreasing the environmental pressure exerted by the chemicals requires reduced doses and decreased drift and leach. To make it possible to reduce the doses without forgoing the final result an efficient application method is required which ensures optimal chemical deposition onto the spray target.

Reduce costs: The modern application method required for better utilization of the chemicals must also be as cheap as possible for the decreased usage to result in reduced overall costs. This is a prerequisite of the method to result in common use.

Application of pesticides may be executed with a real spraying with agricultural sprayer, band spraying or contact application. A real spraying implies that the whole field is prepared/sprayed while band spraying means that only one band including the planting row or the space between the planting rows is sprayed. Contact application means that the pesticide is transferred by direct contact. This type of control occurs only to a limited extent and only in specific control situations. Conventional methods for a real spraying comprise agricultural sprayers equipped with hydraulic sprayers uniformly spaced at a distance of 50 cm along the boom. When spraying, only a fraction of the sprayed liquid reaches the noxious object. Portions of the spray liquid will drift with the wind or evaporate, and some portions will land on the ground or on parts of the plants where the liquid has no effect. Different estimations of the fraction of the sprayed liquid which actually has effect, i.e. reaches the spray target, varies between 0,1 to 30%.

The most important element in reducing the dose, and decreasing the environmental impact, is to achieve good deposition onto the spray target. This is difficult to accomplish with conventional methods because of the following reasons:

High boom level: High boom level, 50 cm above the ground, is required to achieve a uniform liquid distribution. This increases the risk for drift. A cause of increased drift is, among other things, that the droplets are exposed to the wind during a long time period on their way from the nozzle to the spray target. This, in combination with the fact that the wind velocity increases exponentially with increasing distance from ground, makes the boom level an important contributor to the drift.

Boom movements: Boom movements is one of the most important causes for a non-uniform liquid distribution. Both horisontal and vertical boom movements may cause substantial dose variations over the field. The non-uniform liquid distribution results in poor treatment effect, which must be compensated by an increased dose. In addition, there is a risk of damage on the crop in places which receive the highest doses. The vertical boom movements involve also often damage on the nozzles when these are forced into contact with the ground and crop.

Drift: The drift is a problem of great concern which is affected by weather conditions, spray quality and exposure of the droplets to weather influence. At given weather conditions, the only possible measure to reduce the drift with conventional methods is to choose a coarser spray quality. Conventional methods normally use medium or coarse spray quality (big droplets). Coarser spray quality involves lower degree of coverage and therefore lower pesticide control effect which must be compensated with higher dose.

Penetration: With conventional application methods the droplets have low velocity when they reach the stand, which impair the penetration into stands with high density. The droplets also fall vertically which gives poor deposition under leaves and onto vertical surfaces. The penetration is of special importance for instance in control of Phytophthora infestans on potato. Phytophthora infestans on potato causes great losses and the fungus is often hiding in high density stands.

In application with conventional methods, liquid quantities in the order of 200 l/ha (litres per hectare) is often recommended in application onto low crop stands and 300–400 l/ha onto high density and high crop stands. These relatively large liquid quantities decrease the efficiency of control because of the increased number of refillments required, which increases the costs and decreases the spray time. It is not rare that refillments, including transports, occupy one third of the total treatment time. The weather is a very limiting factor for chemical control and the number of opportunities to spray are few. Consequently, it is of great importance that the spray opportunities are efficiently utilized. The possibility to conduct control at optimal time also maximizes the biological effect and facilitates dose reduction.

PRIOR ART

Traditional spray methods have been used since the beginning of chemical control by the end of the 19th century, and it is the purpose of the present invention to solve the accompanying problems. Below, band spraying, contact application and the conventional methods of areal spraying with agricultural sprayer will be described. Regarding areal spraying also more modern methods, intended to solve the problems of conventional areal spraying methods though with unsatisfactory solutions, will be described.

Conventional methods imply that the nozzle/nozzles is/are positioned and mounted on the boom with downwardly directed spray direction.

Band spraying means that a band, including the planting row or the space between planting rows, is sprayed. The method is used for row growing crops such as sugar-beets, strawberrys and outdoor cultivated vegetables. Band spraying may be performed with a modified agricultural sprayer or a separate suitably equipped machine. In order to keep the distance between the ground and the nozzles, one or more, at a constant level, the nozzles are often mounted on runners, such as described in U.S. Pat. No. 2,580,145 and German patent no 1482350. In some cases also tunnels are used to protect both the spray shower from external influence and the portions of the ground/crop not to be sprayed.

In case of contact application, pesticides are transferred to the target by direct contact using ropes, sheets or rolls. Contact application is used, for instance, to control late high-growing weeds in different crops, weeds in watercourses and during control in connection with harvesting with combine. The precondition of using this method, and accomplishing the selective weed control, is that the control object has a deviating, higher height than the surrounding. This makes this method only applicable in very specific control situations.

Irregularities in the liquid distribution when using conventional methods are to a great extent due to boom movements, both horisontal and vertical, while running. These movements depend on the dynamical characteristics of the boom and the sprayer and may to some extent, particularly in the vertical direction, be damped by the use of suspension attachments, as described in German patent no. 2359400.

New application methods used today are often based on some sort of air assistance. Air assistance may be classifed according to two principles, internal or external air assistance.

Internal air assistance means that air is added (by means of a compressor or a fan) inside the nozzle so that the air, together with the liquid, contributes to the droplet formation itself. Independent of the actual method, the principle of internal air assistance makes it, under some circumstances, possible to keep the size of the droplets constant within a certain range, independent of the water flow. In one application of internal air assistance, the required amount of liquid and size of droplets are loaded into a spray computer which controls air and liquid pressure. These systems use conventional deflector nozzles and the recommended boom level is 50 cm or higher. In another application of internal air assistance, nozzles are used where the air flow passes a wing, over which the liquid is led, and forms a film of liquid. The droplets are formed when the liquid is ripped off the edge of the wing by the air jet. The nozzles are spaced with a distance of 16 cm and the recommended boom level is higher than that for conventional methods.

External air assistance means that the air is added (normally by a fan) outside the opening of the nozzle. The formation of droplets is made with conventional nozzles, and the purpose of the air addition is to increase the speed of the droplets towards the spray target. The velocity of the droplets is increased by direct influence of the air jet, or indirectly as the air jet creates a downwardly directed injector effect towards the spray target. When applying methods which use direct influence one also tries to create an air shield which shelters from air drift. The recommended boom level is the same as, or higher than that, for conventional methods.

Another principle includes enclosing of the spray fan against the ground or crop in order to prevent the wind to affect the spray fan.

On the market there were earlier also crop openers available which opened up high crop stands and facilitated lowering of the boom. However, the constructions of the crop openers resulted in strong forces upon the boom construction which caused the booms to break. The crop openers therefore have disappeared from the market.

From the drift point of view it is possible to achieve a positive effect with some applications of internal and external air assistance. However, the result depends to a great extent on the particular settings used, and, in some cases, settings decreasing the drift may result in a risk for poor biological effect. Incorrect settings of air quantities and size of droplets may even result in increased drift.

External air assistance, together with enclosed spray fan and crop opener, may increase the deposition into the crop substantially compared to conventional methods, but often at the expense of increased deposition onto the ground.

As shown above, the current methods have not satisfactory and sufficiently solved the problems of boom movements, boom level, deposition and wind drift. The methods are considerably more expensive than traditional methods and only in exceptional cases is it possible to after-mount the systems on an existing sprayer. The systems require extensive knowledge and carefulness for correct adjustment and all systems, except the one with enclosed spray shower, have at least one more demand for adjustment compared to conventional methods. Some of the systems also require that the adjustments are changed during work depending on wind direction and wind-force.

Conventional methods, as used herein, comprise all prior art.

PURPOSE OF THE INVENTION

The general purpose of the present invention is to provide an apparatus for application of liquids, such as pesticides, which decreases the drift and improves the deposition onto the spray target and improves the spray uniformity, minimizing the consumption of liquids (agrochemicals), decreasing the pressure on the environment and reducing the costs in agriculture. The apparatus is to be after-mountable on a conventional agricultural sprayer without requiring further adjustments. The expression "liquids" in the present application refers primarily to chemical and biological pesticides, such as micro-organisms, different types of plant nutrients and the like, but also all kinds of liquids which can be applied by means of an agricultural sprayer and the apparatus of the present invention.

SHORT DESCRIPTION OF THE INVENTION

The purposes of the invention are achieved by a movable mounting of the nozzles, not on the boom but on a movable, separate part according to the invention, which gives in when making contact with ground or crop. The nozzles will therefore be at. approximately the same distance above the spray target even if the ground is uneven and/or the spray boom is moving vertically. The distance between the nozzles and the spray target can therefore be shortened which decreases the drift. Without this resilient feature, there is an evident risk that the distance between the nozzles and the spray target becomes too short with non-uniform liquid distribution and/or damage on the sprayer as a consequence. In high crop stands the apparatus will open up the stand, which also improves the penetration into stands with high density. The spring system also decreases the risk of horisontal boom movements to impair the deposition.

The invention relates to, besides providing the apparatus described in detail below, the use of this apparatus and a method for producing the central, movable part, below referred to as (A). This part provides a simple construction since it is made in one piece, with low production cost and sufficiently low weight to be mountable on existing booms at used agricultural sprayers.

SHORT DESCRIPTION OF THE DRAWINGS

FIG. 1 is a functional diagram of the invention mounted on a spray boom wherein:
- (A) is the movable part (the resilient construction),
- (B) sheet,
- (C) sprayer (nozzle) and sprayer body, and
- (D) the boom of the agricultural sprayer, on which the apparatus is mounted, $F_x$ and $F_y$ are forces acting on the invention in x and y-direction, respectively.
- (E) is the direction of motion of the sheet when the force/forces $F_x$ and/or $F_y$ is/are acting upon it.
- (G) is the space between the resilient constructions when these are mounted on the sheet (B) and the spray boom (D).

Figure 2:
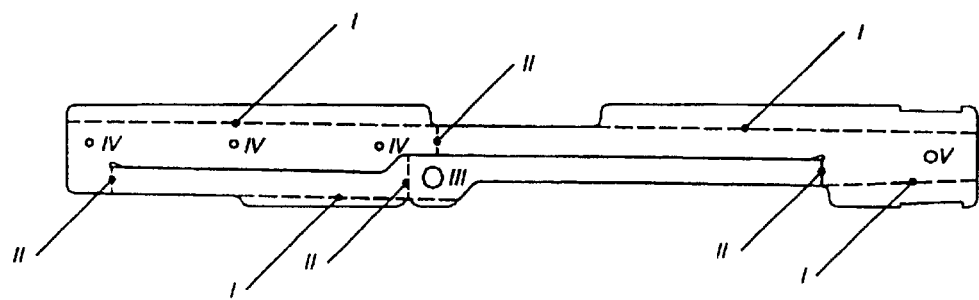

FIG. 2 is detailed view of a preferred embodiment of the movable part (A) before bending, wherein:
- I is a line where stiffening by bending is made,
- II is a line where bending is made to form a parallellogram shape,
- III is a hole for mounting of spray body,
- IV are holes for mounting of the sheet (B) in FIG. 1, and
- V is a hole for mounting of the movable part (A) at the spray boom (D) in FIG. 1.

Figure 3:
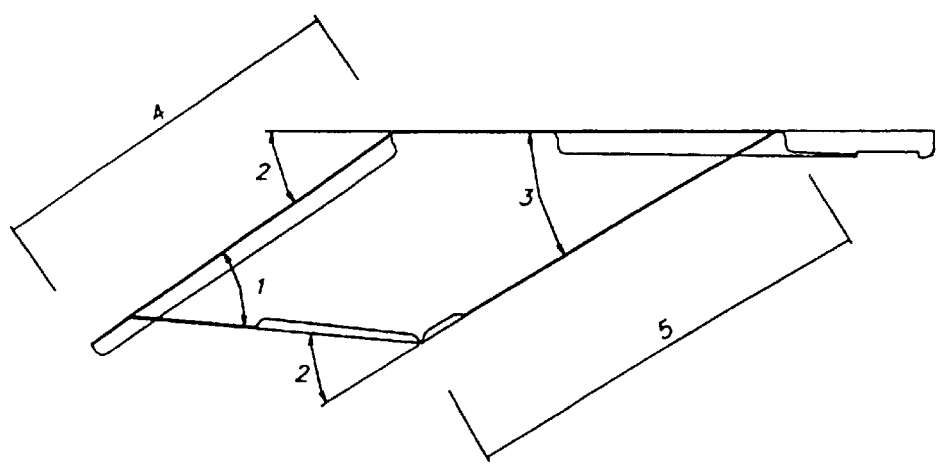

FIG. 3 is a detailed view of a preferred embodiment of the movable part (A) in FIG. 1 in which:
- 1, 2 and 3 illustrate angles that are important for the operation of the movable part,
- 4 illustrates distances on the lower part of the construction on which the sheet is mounted, and
- 5 are distances on the upper part of the construction.

DETAILED DESCRIPTION OF THE INVENTION

The invention will now be described with reference to the appended drawings.

The invention comprises a resilient construction on which the sprayers (C) and a sheet (B) are mounted. The distance between the lower part of the sheet and the sprayer is fixed, which results in a constant distance between the nozzle and the spray target as the sheet follows the ground or the crop. The sprayers are backwardly angled, and the distance between nozzle and spray target (called boom height in conventional methods) is normally only about 20 cm, but may vary between 5–35 cm. When the apparatus is used on bare ground, or in low crop stands, it is run such that the lower part of the sheet is at the level with, or just above, the ground. In high crop stands the lower part of the sheet is held at two thirds of the stand height.

The contact of the sheet with the crop or the ground leads to reduced boom movements. The fixed low boom level and reduced boom movements, result in a substantial reduction of the drift in comparison with conventional methods, as well as in improved uniformity of the distribution. Since the exposure of the spray fan to the influence of wind is small, fine spray quality can be used and therefore it is possible to reduce the amount of liquid without decreasing the degree of coverage. The applied amount of liquid can be reduced to half of the recommended amount of conventional methods, which leads to a more time efficient control which means that larger areas can be controlled at an optimum point of time.

In high crop stands the sheet opens up the crop and sets the crop in motion which improves the deposition in the stand. All the mentioned advantages, such as small drift, good spray uniformity, high degree of coverage, and deposition in the stand and control at an optimum point of time give the possibility to reduce the doses with preserved treatment effect. This reduces the costs and decreases the environmental influence. Further, the apparatus is simple to operate without any extra demands on adjustments compared to conventional methods.

The unique feature according to the invention comprises its movable part (A) which gives the apparatus its particular and desired characteristics.

In addition, the apparatus comprises the part (B), called sheet, which comes into contact with ground or crop, and nozzle and armature (C), where the purpose of the nozzle is to disintegrate the liquid to be applied on ground or crop. Sheet and nozzle are mounted on the movable part which in turn is mounted on the boom (D).

The apparatus according to the invention has, among other things, the following functions which solve the problems described in the background of the invention.

1. To adjust the height of the nozzle (C) above the spray target so that the nozzle, within reasonable limits, will follow the crop or the conductions of the ground even if the boom (D) is moving vertically. This is accomplished by a force F, which can be divided into the composants $F_x$ and $F_y$ (FIG. 1), acting on the sheet (B) when this sheet is in contact with the crop or ground.
2. To adjust the angle between the ground-level plan and the nozzle (C) so that the angle, within reasonable limits, are the same through the whole motion executed by the nozzle (C) in relation to the boom (D) (according to function 1).
3. To return to a rest position, adjusted for spraying when the apparatus is above (not in contact with) ground or crop, when the apparatus is in an unloaded state ($F_x$, $F_y$=0).
4. To damp the horisontal movements of the boom by action of the damping force $F_x$ which is induced by the contact of the sheet with the ground or crop.

These functions are primarily achieved by means of the movable part (A) according to the following.

The nozzles are movably mounted on the movable part/parts (A) and give in when brought into contact with ground or crop. The nozzles will therefore keep approximately the same distance to the spray target even if the ground is uneven and/or the spray boom is moving vertically. This makes it possible to keep a short distance between the nozzle and the spray target which results in decreased drift. Without this construction, there would be an evident risk that the distance between the sprayer and the spray target would become too short with non-uniform liquid distribution and/or damage on the nozzle as a consequence.

In high crop stands the apparatus will open up the stand and set the crop in motion which leads to improved deposition and penetration of high density stands. The contact of the apparatus with the crop also produces a horisontal damping force acting on the boom which decreases the horisontal boom movements and therefore improves the uniformity of the distribution.

Since the construction involves improved deposition into the crop, substantially smaller amounts of liquid can consistently be used. Compared to conventional methods, in many cases only half the recommended amount of liquid is used. This increases the effectiviness of spraying and improves the possibility of application at the optimal point of time and with smaller dose, which gives a positive effect both from an economical and an environmental point of view.

One precondition of this small amounts of liquid to be feasable, with preserved biological effect, is that a fine spray quality can be used. The smaller the droplets the better the coverage. The problem with using small droplets is increased drift and worse penetration. With conventional methods it is often practically impossible to use fine spray quality (small droplets). Tests have shown that the apparatus according to the invention reduces the wind drift by 84% compared to conventional methods and has an excellent deposition into the crop by its unique construction, which facilitates the use of small amounts of liquid. The substantial reduction of the drift, made possible by the invention, allows the desired use of fine spray quality, i.e. smaller and finer droplets than by conventional methods.

In contrast to the conventional methods, the apparatus of the invention has an individual mounting of the nozzles, i.e. the nozzles are not mounted directly on the boom. This enables a desired low boom level with a fixed distance between nozzle and spray target without jeopardizing the uniformity of distribution and risking nozzle damage. The nozzles are angled so that a uniform liquid distribution is achieved despite low boom level.

In one embodiment of the apparatus, the nozzles, one or more, are directed sidewards in order to provide a possibility to spray the spray target from the side during, for instance, band spraying of row growing crops.

By the creation of a force, pointing in the backward direction along the boom, when the apparatus surfs on the ground or the crop during application, the invention involves decreasing boom movements.

It is also because of this low boom level, which ensures that the droplets only are exposed to the lower wind velocities near the ground or the crop, that the decreased drift is achieved.

Preferred Embodiments

It is of crucial importance for the invention that its construction ensures that play and wear and tear of movable elements are avoided. This is accomplished by the manufacturing of the part (A), with the tuned resilient function, in one piece. By means of the unique design of stiffeners and weakeners it has been possible to completely replace physical links, with preserved movability.

By the manufacturing of the movable part (A) in one piece, with an in-built parallellogram shape, the advantage of a low weight of this part is obtained, in addition to other already described advantages. This is a precondition of the apparatus to be mountable on some boom constructions. Since the desired ability to move and spring can be built-in in one piece, there is no need for welding or assembly work during the production of the movable part. This is very advantageous, both from a production and a user point of view, since no problems with increasing costs of production and weakenings of the material arise.

A preferred and suitable material for production of the part (A) is stainless steel, but other materials, such as plastic, can be used. Stainless steel plate fulfill the demands of a light construction with high structural strength and good resistance against chemicals, which provides an easy to care and handle apparatus for application of e.g. agricultural chemicals. This prescription should not be seen as a limitation but all materials with the desired qualities are conceivable for production of the part (A).

The preferred manufacturing of the part (A) results in reasonable costs of production, low weight in order for the apparatus to be mountable on existing booms, and that the construction lacks links and welding seams which otherwise causes wear and tear and fatigue of material.

A preferred manufacturing procedure comprises the following steps:

1. The movable part (A) (FIG. 1), preferably manufactured from stainless steel SS 2331-43 0,8 mm, is preferably cut out by laser or water cutter. The part (A) has, for example, a size of 600 ×67 mm.
2. After the part (A) is cut out and the holes are made, the part (A) is bent along the dashed lines (I) and (II) (FIG. 2). The distances (I) (FIG. 2) are bent about 80 degrees in order to stiffen the part (A). In order to obtain the so-called parallel-logram, the distances (II) are to be bend so that angle (1) (FIG. 3) is 40 degrees, angle (2) is 35 degrees and angle (3) is 31 degrees.
3. The sprayer body with nozzle are mounted in hole (III) (FIG. 2) so that the centre line through to the nozzle is parallell to the distance (5) (FIG. 3).
4. The piece mounted/manufactured according to the steps above, is mounted on the existing boom (D) (FIG. 1) at the point (V) (FIG. 2).
5. The sheet (B) (FIG. 1), which is made of wear resistant plastic, or other suitable material, and has a width of 250 mm, is mounted symmetrically along the distance (4) (FIG. 3). The sheet is divided into sections according to the divisions of the existing boom (D) (FIG. 1). The distance (G) (FIG. 1) between respective part (A) (FIG. 1) is between 250 and 500 mm, preferably 330 mm.

The preferred embodiment is not intended to restrict the scope of the invention.

EXAMPLES

Below, tables with results from comparative tests of the apparatus according to the present invention and conventional apparatuses are presented. In the tables the apparatus of the present application is called the Apparatus.

TABLE 1

Reduction of wind drift
Reduction of wind drift by application with the Apparatus, 25 cm sprayer height, compared to conventional methods, 40 cm boom level.

| Crop and spray quality (nozzle and pressure) | Reduction |
|---|---|
| Short-cut grass ley, spray quality fine (XR 110 01, 4,5 bar) | 84% |
| Short-cut grass ley, spray quality medium (XR 110 04, 2 bar) | 41% |
| Cereals after coming into ear, spray quality fine (XR 110 01, 4,5 bar) | 41% |

TABLE 2

Weed control effect in barley
Preparation: Ariane (MCPA 200 g/l + klopyralid 20 g/l + fluroxipyr 40 g/l; Dow-Elanco). Full dose corresponds to 2 l/ha. Weed density in uncontrolled state: 695 g/m$^2$. Boom level: conventional methods - 50 cm; the Apparatus - 25 cm.

| Method | Dose | Quantity of liquid (l/ha) | Weed control effect (%) |
|---|---|---|---|
| The Apparatus | 1/4 | 100 | 89 |
| Conventional methods | 1/4 | 100 | 22 |
| Conventional methods | 1/4 | 200 | 73 |
| The Apparatus | 1 | 100 | 98 |
| Conventional methods | 1 | 100 | 72 |
| Conventional methods | 1 | 200 | 95 |

TABLE 3

Broad leaved weeds in spring barley

Comparison of weed control effect at different doses, liquid quantities and boom levels. Full dose (per hectare): 10 g Express 75 DF (Tribenuronmetyl 750 g/kg; DuPont) + 0.4 l Starane 180 (Fluroxipyr 180 g/l; Dow Elanco) + 1 l Mangan 235 (Manganesenitrate equivalent to 235 g manganese per liter; Bayer).
Weed control effect

|  | Density of weeds in uncontrolled state (g/m) | Weights of weed in relative numbers | | | | |
| --- | --- | --- | --- | --- | --- | --- |
| Occasion | | A | B | C | D | E |
| Dose | | Untreated | 25% | 50% | 100% | 100% |
| Liquid quantity | | | 100 l/ha | 100 l/ha | 200 l/ha | 200 l/ha |
| Boom level | | | 25 cm | 25 cm | 45 cm | 25 cm |
| Weed species | | | | | | |
| *Matricaria inodora* | 82 | 100 | 1 | 0 | 0 | 0 |
| *Stellaria media* | 37 | 100 | 0 | 0 | 0 | 0 |
| *Sinapsis arvensis* | 37 | 100 | 0 | 0 | 0 | 0 |
| *Myosotis arvensis* | 29 | 100 | 0 | 0 | 0 | 0 |
| *Chenopodium album* | 18 | 100 | 0 | 0 | 0 | 0 |
| Other weeds | 15 | 100 | 47 | 13 | 7 | 67 |
| All weeds | 218 | 100 | 4 | 1 | 1 | 5 |

Time of treatment: crop 3–4 leaves

TABLE 4

Broad leaved weeds in oats

Comparison of weed control effect at different doses, same quantity of liquid and boom level. Full dose (per hectare): 10 g Express 75 DF (Tribenuronmetyl 750 g/kg; DuPont + 0.4 l Starane 180 (Fluroxipyr 180 g/l; Dow Elanco) + 1 l Mangan 235 (Manganesenitrate equivalent to 235 g manganese per liter; Bayer).
Weed control effect

|  | Density of weeds in uncontrolled state (g/m) | Weights of weed in relative numbers | | | | |
| --- | --- | --- | --- | --- | --- | --- |
| Occasion | | A | B | C | D | E |
| Dose | | Untreated | 25% | 50% | 75% | 100% |
| Liquid quantity | | | 100 l/ha | 100 l/ha | 100 l/ha | 100 l/ha |
| Boom level | | | 25 cm | 25 cm | 25 cm | 25 cm |
| Weed species | | | | | | |
| *Galeopsis tetrahit* | 36 | 100 | 6 | 25 | 14 | 36 |
| *Brassica napus* | 17 | 100 | 0 | 24 | 0 | 6 |
| *Myosotis arvensis* | 13 | 100 | 0 | 0 | 0 | 0 |
| *Galium aparine* | 7 | 100 | 100 | 14 | 0 | 14 |
| Other weeds | 12 | 100 | 100 | 0 | 17 | 8 |
| All weeds | 85 | 100 | 25 | 17 | 8 | 19 |

Time of treatment: crop 3 leaves
Note:
Occasion A to E are the terms for the respective occasion of treatment. In Table 3 occasions B, C and D, and in Table 4 occasions B, C, D and E, with boom level 25 cm, has the Apparatus been used.

TABLE 5

Control of herb weeds in spring grain with different spraying methods

Comparison between the Apparatus and conventional boom with different liquid quantities and doses of Ariane (MPCA 200 g/l + klopyralid 20 g/l + fluroxipyr 40 g/l; Dow Elanco).
Weed control effect

| | Weights of weeds g/m² and in relative numbers | | | | | | |
|---|---|---|---|---|---|---|---|
| | A | B | C | D | E | F | G |
| | Untreated | 0.5 lit/ha Ariane 100 lit/ha Apparatus | 0.5 lit/ha Ariane 100 lit/ha Conv. | 0.5 lit/ha Ariane 200 lit/ha Conv. | 2.0 lit/ha Ariane 100 lit/ha Apparatus | 2.0 lit/ha Ariane 200 lit/ha Conv. | 2.0 lit/ha Ariane 200 lit/ha Conv. |
| Weed species | | | | | | | |
| Brassica napus | 610 | 52 | 450 | 167 | 10 | 153 | 26 |
| Erysimum cheiranthoides | 54 | 9 | 43 | 6 | 0 | 26 | 0 |
| Myosotis arvensis | 8 | 2 | 0 | 0 | 0 | 0 | 5 |
| Viola arvensis | 5 | 0 | 2 | 6 | 0 | 0 | 5 |
| Veronika agrestis | 4 | 14 | 27 | 7 | 6 | 14 | 0 |
| Other weeds | 9 | 0 | 15 | 0 | 1 | 2 | 0 |
| All weeds g/m² | 690 | 77 | 537 | 186 | 17 | 195 | 36 |
| All weeds rel. numb. | 100 | 11 | 78 | 27 | 2 | 28 | 5 |

TABLE 6

Spray liquid distribution
Distribution of spray liquid in a stand of potato with different application methods. The amount of liquid used is 200 l/ha. The values refer to normalized deposition. Leaf 1 corresponds to the uppermost level in the stand.

| | Blad 1 | Blad 2 | Blad 3 | Markobjekt |
|---|---|---|---|---|
| Conventional | 59 | 13 | 7 | 21 |
| Air assisted | 42 | 18 | 12 | 28 |
| Enclosed spray shower | 34 | 23 | 12 | 31 |
| The Apparatus | 35 | 22 | 20 | 23 |

Compared to conventional methods the usage of the apparatus of the invention provides:
decreased wind drift and thereby decreased risk for damage on adjacent vegetation and environment,
coverage of almost twice the area by lower amount of liquid per hectare and thereby an improved utilization of the hours well suited for spraying,
twice the covered area per filling giving half the number of fillings, giving reduced risks for driver and environment,
full weed control effect achieved with a lower dose.

The last statement is only valid for leaf herbicides. Reducing the doses of soil herbicides may result in decreased effects and shorter long-term effect, and can not be generally recommended solely based on the use of the apparatus of the present invention. However, leaf herbicides is the predominant type of chemicals used in agriculture and a reduction of the doses of these agents will have a large impact on the total amount of pesticides being used.

Although the present invention has been described with reference to particular embodiments, also shown in the appended drawings, it will be apparent for those skilled in the art that many variations and modifications can be done within the scope of the invention as described in the specification and defined in the following claims.

What is claimed is:

1. An apparatus, including at least one movable part (A), on which a sheet (B) and a nozzle (C) are mounted and the movable part (A) is mounted on a boom (D), which apparatus is intended to be mounted on an agricultural sprayer with the purpose of decreasing the drift and improving the deposition, penetration and uniformity of distribution when applying liquids to a target, characterized in that the movable part (A) of the apparatus is manufactured in one piece from an elastic material and is stiffened and weakened in sections and in mounting and usage has the shape of a parallelogram.

2. An apparatus according to claim 1, characterized in that the nozzle (C) is mounted on the movable part (A) with the jet direction angled backwards towards a running direction of the sprayer.

3. An apparatus according to claim 1, characterized in that the movable part (A) is formed so that the angle of the nozzle (C) to the ground-level plan is substantially constant during operation.

4. An apparatus according to claim 1, characterized in that the sheet (B) follows the undulations of the spray target during operation.

5. An apparatus according to claim 1, characterized in that the height of the nozzle (C) above the spray target is adjusted so that the nozzle follows a crop or the undulations of the ground even if the boom (D) is moving vertically, which is achieved by the action of a force F, which can be divided into the force components $F_x$ and $F_y$, on the sheet (B) when the sheet is in contact with crop/ground.

6. An apparatus according to claim 1, characterized in that the movable part (A) allows the nozzle to keep a constant distance to the spray target independently of the vertical movements of the boom (D).

7. An apparatus according to claim 1, characterized in that the moveable part (A) enables spraying of the target sideways.

8. An apparatus according to claim 1, characterized in that the movable part (A) is mountable on an existing sprayer.

9. An apparatus according to claim 1, characterized in that the sprayer is mounted separately from the boom.

10. An apparatus according to claim 1, characterized in that the distance between the nozzle (C) and the spray target is 5–35 cm.

11. An apparatus according to claim 1, characterized in that horizontal movements of the boom are damped by the force F, induced by the contact of the sheet (B) with the ground or the crop.

12. An apparatus according to claim 10, characterized in that the distance between the nozzle (C) and the spray target is about 20 cm.

13. An apparatus according to claim 1, wherein the movable part (A) is formed from stainless steel.

14. A method of manufacturing an apparatus according to claim 1, wherein the movable part (A) is manufactured from an elongated stainless steel piece, providing holes in said piece, and bending said piece to obtain a parallelogram shape and mounting at least a nozzle thereon in the hole provided.

* * * * *